3,078,152
METHOD OF DESTROYING UNDESIRABLE VEGETATION AND NEMATODES
Anton G. Weiss, Nitro, and John J. D'Amico, Charleston, W. Va., assignors to Monsanto Chemical Company, St. Louis, Mo., a corporation of Delaware
No Drawing. Filed May 1, 1959, Ser. No. 810,224
5 Claims. (Cl. 71—2.3)

This invention relates to methods for the control of undesired vegetation. It is also concerned with control of soil borne pathogenic organisms which attack the underground parts of plants and to compositions employed in practicing these methods.

The widespread use of chlorophenoxy acetic acids for chemical weed control has revealed serious deficiencies. There are weeds of economic importance which are resistant to the chlorophenoxy acetic acids. The removal of susceptible weeds increases the opportunity for resistant species to flourish. Accordingly, there has arisen a need for agents to control such hard to kill weeds as morning glory, field bindweed, Canadian thistle and devil's club. Furthermore, the chlorophenoxy acetic acids are unsafe to use on some crops because they injure or destroy the crop as well as the weeds. For example, cotton is fantastically sensitive to 2,4–D and cotton is a major crop. There is need for means to control weeds growing in cotton and corn. By the present invention it is now possible to take weed eradicant steps in growing cotton and corn without injuring the crop.

A general object of the invention is to destroy undesired vegetation. A particular object of the invention is to destroy weeds resistant to the chlorophenoxy acetic acids. A further general object is to provide improved compositions for agricultural use. A further particular object is to provide agricultural compositions which, in very low concentrations, destroy many broadleaf and some narrowleaf weeds without injuring desired grasses. A further particular object is to eradicate weeds growing in cotton and corn fields without injuring the crop. A further particular object is to provide agricultural compositions which destroy nematodes. Other and further objects will either be apparent or pointed out in the detailed description of the invention which follows.

According to this invention very efficient agricultural compositions are obtained by employing 2-(p-chlorophenoxy)triethylamine as the active ingredient. It has been found that this compound has a high degree of toxicity for many noxious plants. It may be applied in low concentration to destroy many undesirable broadleaf and some narrowleaf weeds without injuring desired grasses. In spite of high toxicity to many important weeds, the compound is relatively innoxious to corn and cotton. Moreover, it is a very effective toxicant for destroying unwanted parasites present in agricultural soils, as for example nematodes.

The para-chloro substituent is replaceable by other halogens, specifically fluorine, bromine and iodine, but is preferably a middle halogen of which chlorine is more desirable but only for economic reasons. One or both alkyl substituents may be replaced by allyl. While the alkyl substituents are desirably ethyl as indicated, they may be varied by substitution of other lower alkyl groups, as for example methyl, propyl and isopropyl or by lower alkoxy substituted lower alkyl groups, as for example methoxyethyl. Instead of an ethylene radical connecting the oxygen and nitrogen, methyl substituted ethylene and trimethylene are suitable. Furthermore, methyl substitution in the benzene ring is permissible. However, the presence of both nitrogen substituents and the position and number of halogen are critical. The new toxicants effect chlorosis of plants but this essential attribute disappears with position isomers, additional halogen and one or no alkyl group on the nitrogen. While the invention will be illustrated with reference to 2-(p-chlorophenoxy)triethylamine, it will be understood that the foregoing variants may be substituted although they are appreciably less active.

The agricultural compositions may be in the form of solids or liquids. The free base, 2-(p-chlorophenoxy)triethylamine, is a stable oil essentially insoluble in water but soluble in common organic solvents including heptane, chloroform, ethanol, ethyl acetate, acetone, ether and benzene. The acid addition and quaternary ammonium salts are more water soluble. They retain in large measure the toxicity of the parent substance. Examples comprise 2-(p-chlorophenoxy)triethylamine phosphate, 2-(p-chlorophenoxy)tetraethylammonium bromide and diethylmethyl[2-(p-chlorophenoxy)ethyl]ammonium iodide. Other typical suitable salts are the hydrochlorides, sulfates and acetates. Where the properties of phytotoxic organic acids can be tolerated, these may constitute the acid element. The salts of 2,4-di-, 2,5-di- and 2,4,5-tri-chlorophenoxy acetic acid and of 2,2-dichloropropionic acid are amber viscous liquids each of which exerts phytotoxic properties characteristic of both the acid and base component.

Solid compositions may be prepared in the form of dusts or granules by mixing the active ingredient with a finely divided solid carrier such as talc, clay, pyrophyllite, silica and fuller's earth. Solid compositions may be applied directly to the plants or soil or dispersed in water and applied as an aqueous dispersion. Instead of adsorbing on a solid carrier, 2-(p-chlorophenoxy)triethylamine may be dispersed directly in water and such composition applied in spray form. Alternatively, an emulsifiable concentrate can be prepared by dissolving it in a suitable organic solvent and adding an emulsifying agent. As dispersing and wetting agents there may be employed soft or hard sodium or potassium soaps, alkylated aromatic sodium sulfonates, such as sodium dodecylbenzenesulfonate, an amine salt, as for example dibutyl ammonium dodecylbenzenesulfonate, alkali metal salts of sulfated fatty alcohols, ethylene oxide condensation products of any of the following: alkyl phenols, tall oil and higher mercaptans. These are illustrations only of a large class of materials available and it will be appreciated that other dispersing and wetting agents may be substituted.

2-(p-chlorophenoxy)triethylamine is particularly effective for control of undesired vegetation by application to foliage thereof. The concentration will vary depending upon the particular vegetation for which control is sought. In general, concentrations within the range of from 0.005% to 0.5% by weight of the total composition are adequate for most purposes although higher concentrations are, of course, very effective but seldom necessary. While toxicity has also been observed from application of the agricultural composition before the plants emerge at dosages within the range of 3 to 50 pounds per acre, application to foilage is much to be preferred. The toxicant is at least four times as active as 2-(2,4-dichlorophenoxy)triethylamine. The latter evokes a hormone like crippling response similar to 2,4-dichlorophenoxy acetic acid but is somewhat weaker and is postulated to be converted slowly to this acid. Neither causes chlorosis. The visual response to 2-(p-chlorophenoxy)triethylamine is completely different. It causes severe chlorosis and eventual death of susceptible plants.

Herbicidal efficiency of 2-(p-chlorophenoxy)triethylamine may be demonstrated as follows:

An aluminum pan flat is filled with a mixture of ⅔ soil, screened through ¼" mesh, and ⅓ sand. Over one-half of the soil surface are scattered 20 seeds each of different kinds of grasses. Seeds of broadleaf plants are scattered randomly over the remaining soil surface. The seeds are then covered with soil to the pan top, and the pan is sprayed with an aqueous solution of fertilizer and an insecticide. The pan is saturated with water and left in the greenhouse for three weeks; after this, the plants in the pan are sprayed with 6 cc. of a 0.5% concentration of the test chemical. This corresponds to a rate of approximately nine pounds per acre. Two bean plants of the Black Valentine variety with one mature trifoliate and one partially opened trifoliat are sprayed with 5 cc. of this same 0.5% concentration of test chemical to determine if any defoliant action is present. The beans and pan are then returned to the greenhouse and held for fourteen days. At the end of this time, observations of the bean plants show that they are severely injured and that some defoliation has taken place. The plants of a mixture of broadleaves and grasses are severely injured. The plants severely injured include those from the family Cruciferae (mustard family), the family Chenopodiaceae of which lambsquarters and Russian thistle are important weeds, the family Convolvulaceae (field bindweed) and crab grass belonging to the family Gramineae (grasses). There is moderate injury to plants representative of the family Polygonaceae (wild buckwheat) and to rye grass and wild oats while injury to cotton and corn is very slight. Where phytotoxicity is observed, it is accompanied and enhanced by chlorosis. In other words, the toxicant interferes with the chlorophyll mechanism in plants.

In a repetition of the above demonstration, the 2-(p-chlorophenoxy)triethylamine is applied to the plants at a concentration of 0.05%. Even at this low rate of application the broadleaved weeds and bean plants as well as plants of the Cruciferae and Chenopodiaceae families are severaly damaged while corn and cotton receive but slight injury. The severe injury to bean plants still persists when the 2-(p-chlorophenoxy)triethylamine is employed at a concentration of 0.005%. At this concentration the broadleaved weeds are moderately injured.

To demonstrate pre-emergence activity, the toxicant is applied at the rate of 25 pounds per acre and the phytotoxicity observed. It is noted that foxtail and crab grass are severely injured while there is moderate injury to pigweed.

Nematocidal activity is demonstrated by preparing a suspension of the nematode *Panagrellus redivivus* in water and observing through a microscope the motility of the organisms in the presence of 0.1% of the test material. The nematode in aqueous suspension will flex its body at a regular rate and as the nematocide takes effect, the rate of flexing is decreased until death of the parasite occurs. The control containing no added toxicant shows undiminished activity after 24 hours whereas complete destruction of the nematode is effected with 2-(p-chyorophenoxy)triethylamine. In actual usage the compound may be added to the soil in solution.

The above data illustrate the potency of 2-(p-chlorophenoxy)triethylamine in agricultural compositions. At a concentration of 0.5% it controls undesired vegetation in cotton and corn fields without adversely affecting the crops. At a concentration of 0.05%, 2-(p-chlorophenoxy)triethylamine eradicates undesirable broadleaved plants without damage to grass crops. At a concentration of 0.1% the material completely destroys nematodes in nematode infested soil.

It is intended to cover all changes and modifications of the examples of the invention herein chosen for purposes of disclosure which do not constitute departures from the spirit and scope of the invention.

What is claimed is:

1. The method for destruction of undesired vegetation which comprises applying to foliage of weeds growing in crops of the group consisting of corn and cotton, in amount sufficient to exert herbicidal action on the undesired vegetation, 2-(p-chlorophenoxy)triethylamine.

2. The method for destruction of undesired vegetation in corn fields which comprises applying to foliage of weeds growing therein a phytotoxic concentration of 2-(p-chlorophenoxy)triethylamine.

3. The method for destruction of undesired vegetation in cotton fields which comprises applying to foliage of weeds growing therein a phytotoxic concentration of 2-(p-chlorophenoxy)triethylamine.

4. The method for destruction of undesired vegetation which comprises applying to the foliage thereof, in amount sufficient to exert herbicidal action, 2-(p-chlorophenoxy)triethylamine.

5. The method of destroying nematodes which comprises mixing with agricultural soil, at a concentration toxic to nematodes, 2-(p-chlorophenoxy)triethylamine.

References Cited in the file of this patent

UNITED STATES PATENTS

| | | |
|---|---|---|
| 2,302,388 | Hester | Nov. 17, 1942 |
| 2,952,678 | Lane | Sept. 13, 1960 |

FOREIGN PATENTS

| | | |
|---|---|---|
| 1,020,031 | Germany | Nov. 28, 1957 |

OTHER REFERENCES

Jones et al. in "Chemical Abstracts," vol. 44, 1950, col. 2161c.

Frear, "Catalogue of Insecticides and Fungicides," vol. 1, page 133, 1947.

King, "Insecticides and Repellants," Agriculture Handbook, No. 69, issued May 1954, U.S. Dept. of Agriculture, page 333.

Jones et al. in "Biochemical Journal," vol. 45, 1949, pages 143–149.